(12) United States Patent
Knauseder

(10) Patent No.: US 7,644,553 B2
(45) Date of Patent: Jan. 12, 2010

(54) PANEL WITH GLUE AND COVERING, AND METHOD AND DEVICE FOR THE PRODUCTION THEREOF

(75) Inventor: Franz Knauseder, Wals (AT)

(73) Assignee: Kaindl, M., Wals (AT)

( * ) Notice: Subject to any disclaimer, the term of this patent is extended or adjusted under 35 U.S.C. 154(b) by 0 days.

(21) Appl. No.: 10/048,680

(22) PCT Filed: Jun. 5, 2001

(86) PCT No.: PCT/EP01/06342

§ 371 (c)(1),
(2), (4) Date: Jan. 31, 2002

(87) PCT Pub. No.: WO01/94721

PCT Pub. Date: Dec. 13, 2001

(65) Prior Publication Data

US 2002/0148551 A1 Oct. 17, 2002

(30) Foreign Application Priority Data

Jun. 6, 2000 (AT) .............................. A 992/2000

(51) Int. Cl.
*E04B 2/00* (2006.01)
(52) U.S. Cl. ..................... 52/588.1; 52/592.1; 403/364; 156/304.5; 156/305
(58) Field of Classification Search ................ 52/588.1, 52/592.1, 592.4, 588.12, 591.3, 592.3; 156/304.5, 156/305; 403/265–268, 271, 272, 292, 339, 403/364, 381, 387
See application file for complete search history.

(56) References Cited

U.S. PATENT DOCUMENTS

| 2,141,313 A | * | 12/1938 | Osgood et al. | ................ | 524/47 |
| 2,839,790 A | * | 6/1958 | Collings | ..................... | 52/591.2 |
| 4,047,347 A | * | 9/1977 | Scheid | ......................... | 52/436 |
| 4,242,390 A | * | 12/1980 | Nemeth | ....................... | 428/47 |
| 4,416,097 A | * | 11/1983 | Weir | ......................... | 52/220.2 |

(Continued)

FOREIGN PATENT DOCUMENTS

AT 405560 A * 9/1999

(Continued)

*Primary Examiner*—Daniel P Stodola
*Assistant Examiner*—Nahid Amiri
(74) *Attorney, Agent, or Firm*—Merchant & Gould P.C.

(57) ABSTRACT

The invention relates to a novel covering, especially a floor covering or similar, based on panels (9, 9') made of wood or a derived timber product, especially (décor) laminated panels of wood or derived timber products, with a carrier on the underside and a wear layer on the visible side. Said panels are adhesively supported, can be arranged laterally and adjacently, and are provided with laterally, optionally mutually latchable or clickable positive locking elements such as grooves (92) and tongues (91). The covering is characterised in that the groove(s) (92) and/or the tongues (91) of individual panels (9, 9') or individual surface areas thereof (921 925; 911 915) is/are provided with a filling, and a coating (95) with an extrusion (96) or similar made adhesive properties during the lateral adjacent assembly of the panels (9, 9') which is carried out by means of the groove(s) (92) and tongue(s) thereof, and/or made out of an adhesive activator which initiates or activates adhesive properties. The invention also relates to the panels used for the covering and production thereof.

4 Claims, 5 Drawing Sheets

U.S. PATENT DOCUMENTS

| | | | |
|---|---|---|---|
| 5,618,602 A * | 4/1997 | Nelson | 52/588.1 |
| 5,639,027 A * | 6/1997 | Fritz | 239/414 |
| 5,944,938 A | 8/1999 | Winterowd et al. | |
| 6,004,417 A * | 12/1999 | Roesch et al. | 156/155 |
| 6,397,548 B1 * | 6/2002 | Martins | 52/588.1 |
| 6,438,919 B1 * | 8/2002 | Knauseder | 52/586.2 |
| 6,536,178 B1 * | 3/2003 | Pålsson et al. | 52/589.1 |

FOREIGN PATENT DOCUMENTS

| | | |
|---|---|---|
| DE | 3117605 A1 * | 11/1982 |
| DE | 297 03 962 U | 4/1997 |
| DE | 29703962 U1 * | 4/1997 |
| EP | 0 200 296 A | 11/1986 |
| EP | 0 698 162 B1 | 2/1996 |
| EP | 0 855 482 B1 | 7/1998 |
| EP | 0 970 755 A | 1/2000 |

* cited by examiner

PANEL WITH GLUE AND COVERING, AND METHOD AND DEVICE FOR THE PRODUCTION THEREOF

BACKGROUND OF THE INVENTION

1. Field of the Invention

The present invention relates to a panel with laterally mounted interlocking elements. The invention relates to a covering made of these panels, a method for its production and an associated apparatus.

2. Related Art

A panel is a plate provided with interlocking elements on its sides. The interlocking elements are designed for the positive interlocking of two panels, for instance at least at right angles to the plate surface. Preferred is the added positive interlocking between panels parallel to the surface and at right angles to the joint between two joined panels. In view of their positive interlocking effect, such interlocking elements are also referred to as positive locking elements. Such panels are described in EP 0 855 482 B1 or EP 0 698 162 B1.

The panels can be assembled to form a covering, lining or the like, in particular a floor covering or the like. The result is a covering based on laterally adjacent panels made of wood or timber, in particular based on wood or timber (decorative) laminate panels with lateral positive locking elements, possibly designed for click-in or snap-in mutual engagement, in particular tongue and groove, supported by bonding, with a lower base layer and a visible wear layer. The invention therefore relates to the panels with positive locking elements used for assembling coverings, linings or the like, to the production of a preferred panel assembly and to an apparatus for the production of the panels.

A great number of planar individual elements with lateral positive locking elements, in particular tongue-and-groove designs, is known. These planar individual elements may be boards, plates, panels, fillets or the like and can be assembled to form planar structures of any size and for a great variety of applications, such as linings for walls, ceilings and in particular floors. This applies particularly to floor coverings, where this technology has been used for a long time for wooden parquet floors. Plates, boards, panels or the like capable of being assembled to form floor coverings, in particular timber laminate panels or the like, require an aesthetically pleasing appearance, a good surface finish and hardness, a high abrasion and wear resistance of their wear layer and in particular a very stable bond, if the individual elements, such as panels, are joined by tongue-and-groove positive locking elements to form a (floor) covering. This applies to various types of loading and particularly to floor coverings. In the case of floor coverings, any tendency of the surfaces assembled from the panels to disintegrate into the original individual panels must be prevented for the entire service live of the covering or floor covering even if subjected to the hardest possible conditions of use.

With regard to the loading mentioned above, this may, for instance, be high and irregularly fluctuating, often substantially point loads, such as those caused by furniture legs, high-heeled shoes or the like on the base, or else movable loads, such as those caused by office containers with castors, wheelchairs or the like.

As has been mentioned briefly, panels or the like made of timber impregnated with heat-cured resin, consisting of a thicker carrier or base layer and an upper, usually relatively thinner but hard, wear-resistant and aesthetically pleasing surface or decorative layer, usually made of paper finally impregnated with heat-cured resin, i.e. timber laminate panels, have been used extensively for floor coverings for a long time.

In order to obtain the above-mentioned high mechanical stability of the tongue-and-groove panels making up a complete covering surface, in particular a floor surface, which is considered to be an essential specification, fresh glue or adhesive has been applied to the grooves and/or tongues of the panels in question before their installation for quite some time. Frequent problems were caused by the fact that a new panel had to be fitted within a relatively short time to form a tongue-and-groove joint with an already installed panel, the joint gaps between the panels having to be reduced to a minimum and—if possible—to near invisibility by lateral force, for instance by knocking or hammering.

A substantial problem has always been posed by manual and hence uneven glue application at the point of use, i.e. while the panels were being laid, and by the control of the quantity of the glue to be applied. If this quantity was insufficient in any surface unit of groove and/or tongue, the quality of the bond was affected and its durability placed at risk. If, on the other hand, too much glue was used, which occurred much more often for obvious reasons, the surplus glue had to be displaced through and from the gaps between the panels to permit their proper assembly, which became more difficult as the time between the application of the glue and the assembly of the panels increased. The result was that the gaps, even after being subjected to high and intensive lateral forces when "knocking together" the panels, remained too wide and thus did no longer disappear from sight. Another drawback was that the glue emerging from the gaps between the panels spread over the decorative surface of the covering at least near the gaps, thus contaminating the surface. While joining the panels, an operation which in itself requires a lot of attention, it therefore had to be ensured that the glue emerging from the gaps was removed, for instance wiped off, as soon as possible after the application of glue and the assembly of the panels, so that it could not dry out. If the glue was wiped off even a little too late, stains remained on the floor covering, affecting the optical properties of the decorative surface, for instance by being glossier that the rest of the panel or covering; this could have a bad effect on is appearance under certain circumstances.

DE 297 03 962 U1 suggests the application of an adhesive capable of transition from a passive to an active state on the sides of panels of the type mentioned above. Owing to the fact that there are no concrete embodiments, the suggested invention cannot be implemented by the expert. A suitable invention therefore has yet to be completed or published.

SUMMARY OF THE INVENTION

The invention is based on the problem of creating panels which can be laid in a particularly simple way.

This problem is solved by the subject matter or methods of the independent claims. Advantageous further developments are described in the sub-claims.

Providing the sides of panels of the type referred to above with an adhesive capable of transition from a passive to an active state makes their installation significantly easier and faster. Many embodiments described below will illustrate the character of the claimed adhesive.

The present invention avoids the need for the application of fresh glue, adhesive or the like to the grooves and/or tongues of the panels in the course of laying the panels and assembling them to form a larger planar structure, in particular a floor covering, at the point of use, and thus the unpleasantness and inconvenience involved as described above, and transfers the action of applying the bonding agent from the point where the panels are laid and bonded to the point of manufacture, thus integrating this action into the panel production process.

The subject matter of the invention is therefore a covering, lining or the like as described above and in particular a floor covering characterised in that the groove(s) and/or tongue(s) of individual panels or individual areas thereof are coated with a filler, coating or bead of an adhesive with self-adhesive properties or of a latent adhesive developing adhesive properties when the panels are laterally joined by their groove(s) and/or tongue(s), or of an adhesive pre-material (adhesive precursor, adhesive component), and/or of an adhesive activator activating or initiating such adhesive properties.

According to the invention, at least one of the lateral positive locking elements of the planar individual elements, in particular of the panels, of the covering is coated during production with a permanently active, i.e. "instantly" adherent, direct adhesive layer, coating or the like, or else with a coating or the like consisting of individual adhesive components which form an adhesive, developing adhesive properties only when being joined mechanically, i.e. when the panels are being joined together, an intensive process generally involving pressure and shear effects, or else with a coating of a latent adhesive available in a reversible permanent or dry state, which can be converted (back) to its original active state as prevailing in one embodiment by the simple local application of an activator, for instance by hydration by means of spraying.

DETAILED DESCRIPTION

Figure 8:
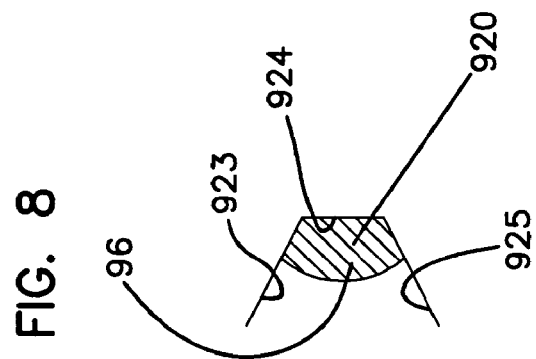
FIG. 8 is a diagrammatic section through part of a covering with an adhesive bead in a groove.

Such panels provided in advance with an adhesive—whether active from the start or only activated when joining the panels locally—offer the obvious advantage that the number of actions and manipulation steps involved in laying the panels locally is substantially reduced and the step of applying an adequate but not surplus quantity of a tacky substance as evenly as possible over the entire lateral length of the grooves and/or tongues of the panels, which may be as much as 2 m, a task considered both time-consuming and inconvenient by both professionals and handymen, is avoided at the point of installation. This not only solves the problem posed by premature curing of the adhesive when delays are experienced in the course of laying the panels, which makes a virtually gap-free assembly impossible, but also the problem of the above-described undesirable extrusion of surplus adhesive, which has to be removed as soon as possible after emerging from the joints in order to avoid stains on the decorative layer.

Whichever of the basic forms of adhesive described above is used for the grooves and/or tongues of the panels, it is applied in advance by machine, and thus accurately metered, to the panel, board or the like before delivery to the point of installation. The extrusion of surplus adhesive onto the decorative surface when assembling the panels is therefore avoided. The risk of "premature" curing—as described above—is avoided as well.

With regard to the various adhesives which are generally suitable for the invention, the following explanations are offered:

The first adhesives to be mentioned are the most commonly used glues. Glues are adhesives consisting of water-soluble animal (glutine, casein), vegetable (starch, dextrin, cellulose ether) or synthetic (e.g. derivatives of polyacrylic acid, polyvinyl alcohol, polyvinyl pyrrolidone) polymers and water as solvent. These belong to the class of cold-curing one-component adhesives, whereby the solvent (water) is absorbed, escapes or the like during the bonding process. The applied glues become gelatinous when cooling, usually drying to form a transparent mass. In contact with water, this dissolves to form a highly adhesive gel.

Some glues which are particularly suitable in the context of the invention should be mentioned here. Suitable materials are both fully synthetic glues such as synthetic resins, e.g. polyvinyl acetate wood glue, and vegetable glues such as dextrin, starch, sago or tapioca glue as well as animal glues such as skin, leather, bone and casein glue. In addition to the physically curing glues, chemically curing glues can be used as well, such as those based on urea, melamine, phenolic or cresol resins.

Other suitable material are, for instance, so-called all-purpose adhesives. These are generally solutions or dispersions of polymers, e.g. cellulose nitrate, polyvinyl acetate, polyacrylate etc., with (alcohol) esters and/or ketones or water as solvents or with water as dispersing agent. All-purpose adhesives are cured when the solvent/dispersing agent escapes into the atmosphere (evaporation) or is transferred to the (porous) substrate to be bonded. In the panels according to the invention, they are applied to the grooves and/or tongues in their "wet" or gelatinous state, followed by the abstraction of the solvent or dispersing agent and thus their transition to a permanent state stable enough for storage.

Other possible adhesives are contact adhesives applied to the substrates to be bonded in the form of solutions or dispersions, which, following the extensive evaporation of the solvents, i.e. when the adhesive film appears to be dry, develop their adhesive properties under pressure when the panels are assembled. The base polymers of contact adhesives are mainly polyacrylates, polychloroprenes, nitrile or styrene/butadiene rubbers and polyurethanes. In addition, these may contain adhesion-promoting resins such as rosin, hydrocarbon or phenolic resins as "tackifiers".

Under certain circumstances, so-called anaerobic adhesives curing in the absence of air while remaining fully fluid and adhesive in the presence of oxygen can also be used. These are, for instance, based on monomeric dimethacrylic acid esters of diols, e.g. polyethylene glycols.

In an expedient embodiment of the invention, the positive locking elements, i.e. the grooves and/or tongues, of the panels are provided with a latent coating converted to its readyfor-bonding adhesive state by activation in the course of installation, the conversion involving either a simple transition from a dry or permanent state of an originally ready-for-bonding adhesive by means of moistening with a solvent, in particular water, or an activation of the latent adhesive by means of an activator initiating its setting and cure.

According to another preferred embodiment, the positive locking elements of the covering are coated with an adhesive capable of activation. An adhesive, glue or the like originally prepared with water—either dissolved thereby or therein to form a gel-like substance or dispersed therein—is applied as a coating in its fresh "wet" state and then "dried". By the application of water—either directly on the dried adhesive layer or by indirect intensive contact with water applied to a (mating) positive locking element of an adjacent panel to be joined—the "dry" adhesive is activated and returned to its active, ready-for-bonding state when the panels are assembled. The preferably aqueous activator is applied to the appropriate surface(s) of the positive locking elements of the panels either by simple metered spraying or with the aid of a rubber sponge or the like.

Boding agents, adhesives, glues or the like especially suitable for this type of reactivation include a fast-curing assembly glued based on polyvinyl acetate, such Dorus MDO 55 (made by Henkel), or of another commercially available wood glue, for inistance, based on starch and/or protein.

A further expedient way of activating the latent coatings of grooves and/or tongues of the panels used for coverings, in particular floor coverings, by means of polymer-chemical processes is disclosed, in accordance with which the individual components of a two-component adhesive system are applied to the positive locking elements in a state in which their adhesive, setting and curing properties only become effective at the moment when the panels are joined to lay the coverings according to the invention.

Only the joining process itself initiates the activation of the components mentioned above, the generation of the adhesive as such and finally its setting and cure, forming a mechanically stable adhesive bond.

An expedient variant of the invention is based on the fact that the two individual components which will in the end form the active bonding agent are applied to the positive locking elements and/or the mating positive locking elements, i.e. the grooves and/or tongues of the panels in their inert state.

Another possible variant is to apply only one of the two components during the manufacture of the panels, while the other component is applied locally immediately before laying and joining the panels to form a planar covering. In this embodiment, the correct metering of the adhesive is ensured. Any surplus of the last-applied component emerging from the gaps between the elements of the covering would not adhere and can therefore be removed without any difficulty. Since the second component is applied immediately before laying the panels, the adhesive cannot accidentally be activated prematurely and detrimentally as a result of environmental or other influences. Such an adhesive precursor coating can be prepared in a particularly simple and reliable manner by applying a so-called hardening lacquer, i.e. a paint film of or with the hardener component of a two-component adhesive, to at least one of the positive locking elements, while the other component, such as the resin component, is applied immediately before the panels are laid either to the hardening lacquer or to a positive locking element coming into contact with the hardening lacquer when the panels are joined.

The adhesive may include concrete base two-component systems which have proved extremely durable and stable in practical use, particularly with heavily loaded floor coverings. Such systems may include hardening lacquer based on an aliphatic or cycloaliphetic polyamine, and a resin component based on an epoxy and/or bispherol A and/or F resin.

With regard to the range of acrylate adhesives, the following additional remarks apply: The acrylate adhesives are based on acrylic monomers, in particular on acrylic and methacrylic acid esters. In the narrower sense, acrylate adhesives consist of (meth)acrylic monomers, a polymer used as thickening and elasticizing agent and a polymerization initiator, preferably a redox initiator. They are used as two-component adhesives in combination with an activator. Instead of methyl methacrylate, less volatile and odorous (meth)acrylates, such as oligomeric polyurethane dimethacrylates, are now preferred, which is particularly useful for health and safety reasons when this resin component is applied before the panels are laid.

Other possible adhesive components of acrylate adhesives are polymers based on ethyl or butyl acrylate with properties such as hardness and elasticity adjustable as required during polymerisation by the addition of suitable comonomers, e.g. methacrylates; these may contain additional functional groups, such as carboxyl or hydroxyl groups, to improve their adhesive properties. They are widely used as contact adhesives, for instance in the form of solutions or dispersions. Bonds based on acrylate adhesives exhibit very high strength values.

Another embodiment of the invention simplifying the installation of the panels is based on the concept that at least one of the positive locking elements of the panels is provided with a so-called "double sided" adhesive tape directly bonded with one of its adhesive sides to one of the positive locking elements or one of its surfaces, side faces or the like, while other, permanently adhesive side remains open. This free, permanently adhesive side of the double sided adhesive tape extending along the positive locking elements can be covered with protective tape or the like, which simply has to be removed before laying and joining each panel. This embodiment is in particular used for panels with positive locking elements or interlocking elements which interlock the joined panels in at least two directions at rights angles to each other. Such panels are then typically interlocked both at right angles and parallel to the surface of the covering as a result of positive locking. The interlocking devices referred to above also basically enclose a tight angle with the joint between two assembled panels. The joined panels are then, for instance, used as flooring. The self-adhesive tape is, in this embodiment, generally not used as a means of joining two panels, but rather to protect against moisture. Otherwise, water could enter the joint virtually unimpeded. This can be destructive in the case of laminate panels based on timber materials. For this reason, such an adhesive tape is in this case applied to lie near the surface, in particular adjoining it. The surface is, in this context, that surface of the panels which is freely accessible after their installation. In this way, moisture is reliably prevented from entering the joints, thus solving one of the most important problems of such panels in a particularly user-friendly, reliable and simple manner. The faultless joining of such panels without, for instance, glue spoiling the surface or gaps remaining between adjoining panels no longer requires an expert. Gaps between two panels are avoided by producing interlocking elements which are true to size.

The protection against moisture referred to above can be achieved by using one of the other adhesives according to the invention instead of the adhesive tape. For optimum protection against moisture, the adhesive has to cover at least those lateral areas of the panels which adjoin the surface of the installed panels.

Suitable backing films for the self-adhesive tape are films made of polyvinyl chloride, polypropylene, cellulose acetate, polyester or the like coated with a self-adhesive compound, i.e. a contact adhesive.

A further variant of the invention, which is rather cost-intensive and therefore particularly suitable for upmarket coverings, includes a ready-for-bonding adhesive enclosed in microcapsules. According to this variant, the positive locking elements of the panels of the new (floor) coverings are coated or covered with an adhesive, glue or the like encapsulated in hollow microspheres or the like but remaining in a permanently adhesive state ready for instant use. When the panels are joined, i.e. the grooves and tongues brought into engagement, the shells of the microcapsules are destroyed or torn by the shearing and compressive forces employed, releasing the ready-for-bonding adhesive contained in the capsules. If this embodiment is to be used to protect panels with the two interlocking elements described above against moisture, the interlocking elements should be so designed that the panels are joined to each other by means of a rotary movement about a connecting edge. Such panels are commercially available. They are, for instance, provided with lateral grooves and tongues as interlocking elements to effect interlocking at right angles to the above-mentioned surface. The lower lip or flank of a groove has a greater lateral projection than the upper lip or flank. At or near the end of this lip or flank, an interlocking element projects in the direction of the surface defined above. On one side of a panel, where there is a tongue, a further groove accessible from the underside of a panel is provided. By means of a rotary movement, the above-mentioned interlocking elements are brought into an engagement which eventually ensures the interlocking of the panels in the two directions mentioned above. The projecting lower lip in particular, together with the interlocking element, is so designed that the joint cannot be released in a non-destructive manner by displacement in one plane, i.e. by pulling apart. This development of the invention has the result that the adhesive is put under pressure by means of lever action. The transmission of forces required whenever the adhesive is activated by pressure is here achieved quite effortlessly. Since surfaces to be bonded invariably have to be compressed, this form of force transmission offers particular advantages when using adhesives whose adhesive properties are activated by other means, for instance by exposure to heat.

Another expedient way of supplying the adhesive coating applied to the groove and/or tongue of the panels in microcapsules requires that one of the positive locking elements is provided with a coating containing one of the two components of the two-component adhesive system referred to above in microcapsules. The (mating) positive locking element of the panel to be joined is coated with the other component of the adhesive system, likewise contained in microcapsules.

When the panels are joined, the shells of the microcapsules are torn open and the resin and hardener components meet, the adhesive adopts its final form and the bond is initiated, followed by setting and curing.

Another system includes a coating with a two-component adhesive system based on microcapsules, wherein, however, only one—for instance the more sensitive—component is contained in the microcapsules, while the other—expediently the less sensitive—component of the system forms a matrix for the microcapsules of the former component.

A further way of bonding the panels of a new floor covering, which has proved useful on the basis of good test results and practical experience includes grooves and/or tongues of the panels that are covered or coated with a contact adhesive, in particular with a contact melt adhesive.

A further way of bonding the panels of a new floor covering, which has proved useful on the basis of good test results and practical experience, is described in claim 14, according to which the grooves and/or tongues of the panels are covered or coated with a contact adhesive, in particular with a contact melt adhesive.

Contact adhesives are viscoelastic adhesives which remain permanently tacky and adhesive in a solvent-free form at ambient temperature and adhere to virtually any substrate at low substrate specificity under light contact pressure. Base polymers for modern contact adhesives are natural and synthetic rubbers, polyacrylates, polyesters, polychloroprenes, polyisobutenes, polyvinyl ethers and polyurethanes used in combination with additives such as other resins, plasticisers and/or antioxidants. Contact adhesives are generally applied to the positive locking elements as solutions or dispersions.

Contact adhesives are, in particular, used as moisture protection agents with panels which are positive locking in the two directions mentioned above and where force cannot be transmitted by the lever movement described above. Examples for this are panels with lateral grooves having lips or flanks of equal length. There is therefore no flank projecting relative to the other flank. Within such a groove, at least one projecting interlocking element is then provided on one flank. The tongue on the side of a further panel than has a groove to engage the interlocking element on the flank mentioned above, thus effecting an interlock parallel to the surface of the covering.

Since an embodiment of this type cannot as a rule be subjected to a force by means of lever movement, adhesives requiring no or very little force for activation are preferred.

Contact melt adhesives are applied in the melt gel state using a painting, coating or extrusion method, or else by hot-spraying of the melted adhesive. The difference between contact adhesives and so-called structural adhesives, i.e. chemically reacting adhesives, lies in the fact that the former are permanently tacky and permanently adhesive. By being pressed against the surface of the parts to be bonded, such adhesives cause a wetting of these surfaces, whereby sufficient adhesive forces are developed. The critical parameters involved in bonding tongue-and-groove panels are contact pressure and adhesive quantity. The adhesive quantity to be applied has to be considered very carefully—which poses no problem in the context of panel production—because wetting will be inadequate unless enough adhesive is used. If, on the other hand, too much adhesive is used, the gap remaining after joining the panels will be too large, because the adhesive cannot be displaced; this is a disadvantage which is, however, avoided by applying the adhesive at the production stage. Contact adhesives applied as a melt, i.e. the so-called contact melt adhesives, offer the advantage that they can be applied with adequate coating thickness, thus avoiding the above problem of inadequate thickness of the adhesive film; another advantage lies in the fact that they can be metered very precisely.

Another factor worth mentioning about contact or contact melt adhesives is that the strength and adhesive forces developed as a result of contact pressure are somewhat lower than in the case of adhesives such as chemically reacting adhesives, but are perfectly adequate for floor coverings.

In particular, it is possible to obtain good protection against moisture in cases where this aspect is considered more important than the interlock itself.

One great advantage of using contact melt adhesives for bonding tongue-and-groove panels lies in the fact that they retain their "tack", i.e. their adhesive properties, even after prolonged storage; this means that they are not cured. Other advantages are their environment-friendly properties, containing no water or solvent, the modest space and investment requirements of the associated processing plant and the relatively low energy consumption involved in their processing.

With regard to the production of panels with an adhesive film applied to their positive locking elements, a contact melt adhesive with viscosity values between 15000 and 1500 centipoise in a temperature range of 140 to 170° C., which is applied within the above temperature range, preferably at temperatures between 145 and 155° C. have proved very useful.

Two commercially available contact melt adhesives particularly suitable for heavily loaded floor coverings, which result in a secure joint between panels, are Dorus PS 534/5 and/or Dorus PS 576/6 (made by Henkel).

The contact melt adhesive Dorus PS 534/5" is a low-viscosity contact melt adhesive with a relatively high softening point and good shear strength values for this type of adhesive. For use in handguns and other small applicators, this adhesive can be specially stabilized as a preventive measure against degradation at low usage and high processing temperatures. The recommended processing and application temperature lies between 140 and 170° C. In the actual bonding of panels based on timber laminate, an application temperature in the range of 150° C. has been found useful. In normal dry conditions, the adhesive coating for grooves and/or tongues can be stored for at least one year.

The viscosity of "Dorus PS 57/6", the other contact melt adhesive lies below the viscosity of Dorus 534/5. It is characterized by a high free tackiness. The softening point is similar to that of Dorus PS 534/5. Application temperature and storage life, too, are essentially similar to the values of the contact melt adhesive Dorus PS 534/5. The latent adhesive coating produced with Dorus 576/6 can also be stored for at least one year.

As has been briefly mentioned above, the problem posed by panels for various types of coverings, to which adhesive coatings are applied at the production stage, lies in the fact that the adhesive has to be deposited, applied or the like in a form which does not change for a long time after preparation and is not changed by external influences. When the panels are joined to produce coverings, in particular floor coverings, however, an immediate transition to the ready-for-bonding state of the adhesive is required.

Major test series have indicated that ready-for-bonding adhesives, glues etc. for the panels of coverings need not necessarily be available in the form of microcapsules as described in detail above, but can be applied to the positive locking elements of the panels—in practice in the form of "macrocapsules"—as a tube-like integral strand.

According to this variant, the deposited adhesive is, in its ready-for-bonding state, enclosed as core strand in a tightly sealed continuous tubular casing, this casing immediately adhering to the groove or tongue of the panels or to one of their surfaces or flanks on application.

This adhesive casing protects the adhesive substance of the core strand against external influences, thus preventing its change. At the same time, the tubular casing is mechanically sensitive enough to tear when the panels are joined, thus releasing the ready-for-bonding adhesive it has kept fresh for setting and curing. The fragments of the torn casing are so thin that they do not impede the above-mentioned precise "gap-free" joining of the panels with extremely small, barely visible gaps or joints.

With the aid of the continuous adhesive casing/core strand described above and its precise dimensions, the adhesive can be accurately metered, in terms of quantity per unit of length of the positive locking element in question, in accordance with the geometrical conditions and tolerances of the tongue-and-groove joint. In this way, the very even application of the adhesive is ensured, and the extrusion of surplus adhesive with its unpleasant consequences, which have been described above, is avoided. Even a layman can lay such panels without experiencing any problems.

Suitable polymers or adhesives for the casings of the novel adhesive strands expediently set very rapidly following extrusion, thus preventing any escape of the core adhesive during the application of the integral adhesive strand. Suitable polymers should be compatible with the core adhesive, for instance extracting only a minimum of water from a core wood glue, and they should allow virtually no diffusion of water from the core adhesive after the application process.

A casing/core strand adhesive system that includes butyl rubber, or a polyurethane rubber compound consisting of two components or moisture cross-linking on application has been found to be particularly suitable for heavy-duty floor coverings.

The "butyl adhesives" mentioned in this claim have been found to protect the core adhesive against "drying out" over prolonged periods of time, i.e. several weeks or months. Adhesives based on polyurethane rubber are, however, also suitable for the casing strand.

Techniques of co-extrusion of casing adhesive and core adhesive, which is to be preferred for the production of the new continuous adhesive casing/core strand, may be performed using an integral strand applicator with a central die for extrusion of the adhesive strand enclosed by annular die for extrusion of the casing strand.

A preferred cross-section of the casing/core adhesive strand in the grove and/or on the tongue of the panels af the new floor coverings ready for installation and bonding includes: The casing/core strand extruded from the co-extruder, which initially has a concentric circular cross-section, adopts, while being applied in its still soft state, a substantially flattened round form comparable to the cross-section of a loaf of bread under the influence of gravity. An adhesive coating of uniform thickness such as provided in various other embodiments of the invention explained above is not provided for in this case.

The polymers or adhesives used for the co-extruded strand described above will, of course, have to fulfil the condition that the skin forming the casing is resistant to diffusion. If the protective casing is impaired by bubbles, contaminants or injury, there would be a risk that the glue of the core strand could cure locally. The result would be that the tongue-and-groove geometry could no longer be perfectly joined, i.e. virtually "gap-free".

With regard to the control of the skin thickness of the casing strand, it has to be said that the casing strand material itself must not prevent the desired "gap-free" joining and moulding of the panels. The skin has to allow the core adhesive to reach the wood or timber during the joining process and must not occupy any major areas between wood and glue. This may be supported by geometrical changes to the groove if required.

With regard to the viscosity of the casing and core strand materials, it has to be emphasised that the necessarily simultaneous and even extrusion of casing and core polymer in the required constant ratios must be implemented with as little technical effort as possible. Unacceptably high viscosities often result in relatively high feed pressures, while unacceptably low viscosities would adversely affect both transfer stability and the formation of the casing skin, the core strand or the strand as a whole in the co-extrusion process. A true matching of the viscosities of the two substrates during the application process has not been found necessary.

With regard to feed pressure, commercially available butyl rubbers or moisture-crosslinking polyurethanes generally have high viscosities, and feed pressures up to 20 bar have been found useful for the co-extrusion of these adhesives.

With regard to the temperature differences between core and casing polymer in the extrusion of the integral adhesive strand, it may be expedient to provide for the heating of each of the two components for casing and core in the metering system as far as the co-extrusion die. It is further expedient to extrude the two adhesive polymers at approximately equal temperatures. If the temperature differences between core and casing strand are excessive during the application of the integral strand, separate measures for thermal insulation and separate heating arrangements are required.

With regard to the dimensions or sizing of the adhesive strand, a concrete example of laminate panels with a groove width of approximately 3 mm would require the adhesive bead or strand diameter to lie within this dimension. The production of core-and-casing adhesive strands with a minimum diameter of 1.5 mm and a minimum casing thickness of 0.15 mm has been found to be relatively cost effective and not posed any technological problems.

The term "coating", as used in herein, is her not to be understood in its narrower sense and does not necessarily imply a coating of even thickness covering the whole surface. The tenn covers, in this context, also coatings applied as flat adhesive beads or the like.

In the context of timber laminates, the following future trends should be noted:

In view of the continuously changing market situation, the laminate industry as well as processors and do-it-yourself enthusiasts would welcome adhesive-free laminate laying systems, i.e. systems in which the lateral cohesion of the panels is based on the mutual snapping- or clicking-in of grooves and tongues with suitable cross-sections.

In a first such system, a tongue divided at its front flank by a leaf spring-like spreadable groove of suitable design with undercutting base snaps over a "coupling" projecting from the base of the groove of the adjacent panel and designed with a thickened free edge. This results in positive locking supported by a mechanical catch arrangement and thus in a lateral cohesion of the panels without the need for an adhesive.

In a second type of click-in engagement between the grooves and tongues of the panels, there is also a divided tongue. When the panels are joined, the two parts of the tongue are separated by a web projecting from the groove of the adjacent panels. Suitable undercutting results in a secure click-in engagement of the panels after they have been firmly pushed together.

A particularly simple solution is offered by tongue-and-groove click-in systems of a third type, wherein only one undercut groove capable of being forced apart by the insertion of the thickened edge of a tongue of the adjacent panel is provided, which re-closes as soon as the thickened section of the tongue is latched in the undercut zone of the groove, resulting in a mechanical latch or interlock.

Extensive testing of such systems indicates that panels joined by such self-holding, click-in systems can benefit not only from the protection of moisture described above, but also from an additional strengthening of the bond by the application of glue. As has been explained at the beginning, the installer of coverings consisting of panels with laterally engaging positive locking elements can no longer be expected to apply glue locally to the positive locking elements. For such upmarket and correspondingly expensive panel systems, the present invention, which involves the application of glue or adhesive during the production of the panels themselves, is therefore particularly useful.

Of the adhesive systems described above for panels with pre-applied adhesive, those adhesives which do not require the local application of an activator for a glue applied previously or of the second component of a two-component adhesive to the film of first component applied in the factory are obviously to be preferred.

With regard to the application of the adhesive to the click-in positive locking elements, all adhesive application methods, such as application by brush, roller, thin-film application or the like are suitable, provided that the adhesive film applied can withstand the shear loads involved in pushing together the click-in positive locking elements without losing its adhesion to the panel substrate on the one hand, and provided that the film thickness remains even in the range of as little as 0.3 mm, or better still 0.2 mm or less, otherwise the volume and thus the space requirement of the adhesive would locally be too large, making positive locking, in particular the proper mutual latching of groove and tongue, impossible.

The adhesive is therefore preferably applied in the form of a contact melt adhesive to the groove and/or the tongue by spraying; this applies not only to the click-in tongue-and-groove panels described above, which interlock at least in the two mentioned directions, but also to panels with any type of positive locking elements. A spraying thickness in the range up to 0.25 mm has been found effective for one-sided application, i.e. application to the grooves or to the tongues only. With double-sided application to both the groove and the tongue surfaces, the film thickness will have to be reduced accordingly, otherwise positive locking could no longer be achieved without the application of force.

With coverings consisting of click-in positive locking panels, the strength of the bond between the panels could be increased to as much as double the original value, a typical value being approximately +70%.

As has been mentioned at the beginning, another essential subject matter of the present invention is panels, plates, boards, laths, fillets or the like (for the construction of the coverings, linings or the like described above, in particular floor coverings), which can be laid in positive locking co-operation and are ready for bonding. These are provided with adhesive(s) in exactly the same way as described in detail above for the coverings made from them in various preferred variants.

Figure 7:
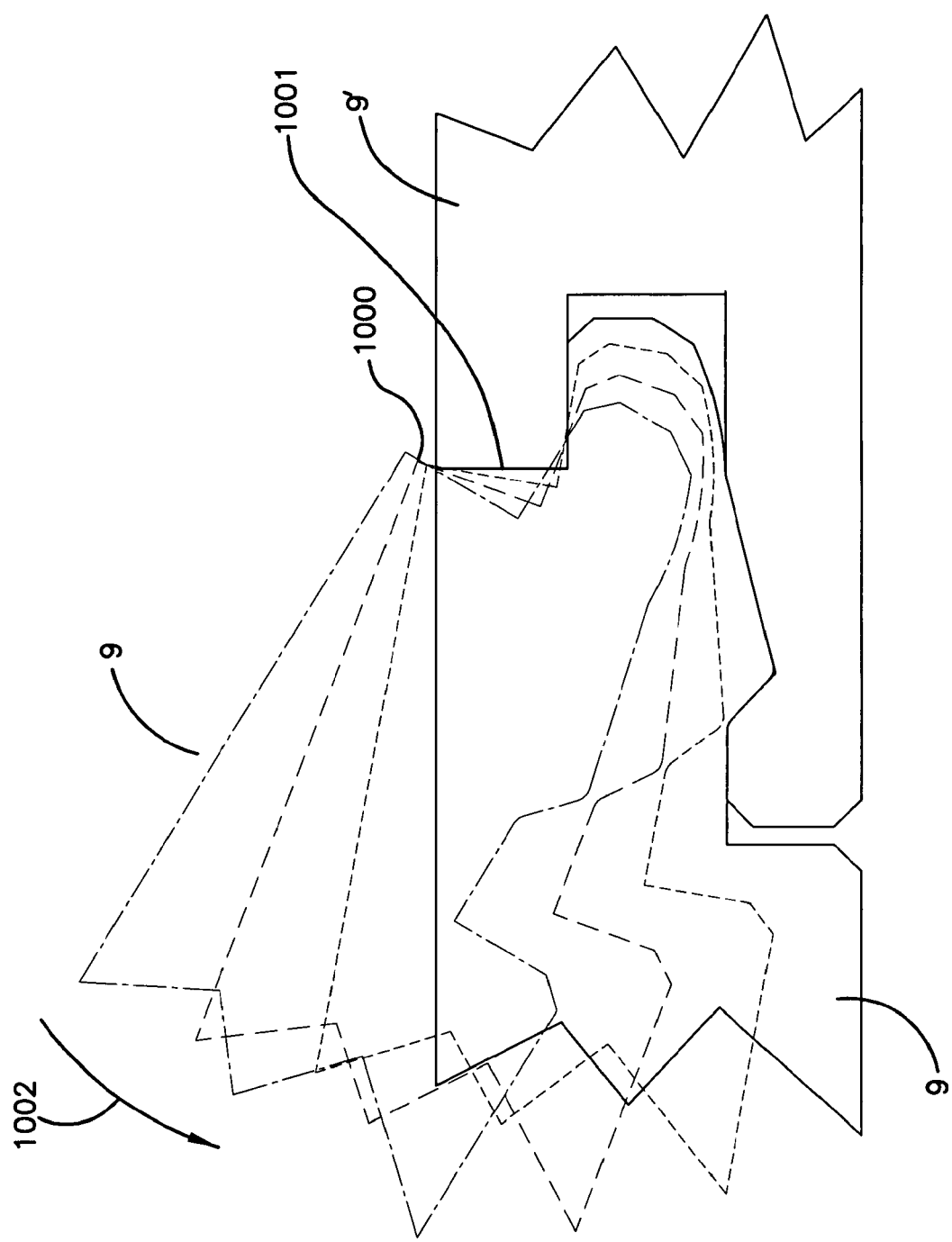
FIG. 7 is a cross-sectional view of two panels of a covering joined by to rotating about a common joint

The advantages and effects of individual variants of the present invention are explained, for instance in the description relating to FIG. 7.

With regard to a novel way of applying the casing/core adhesive strands described in detail above to the grooves and/or tongues of the (floor) covering panels, this forms another subject matter of the invention described.

The present invention also relates to a new co-extruder specifically designed for the extrusion of the adhesive in its casing/core strand variant and for its application to the grooves and/or tongues of the covering panels.

The new extruder is characterised in that is comprises a plurality of components or parts with tight unthreaded connections in the area of contact with the adhesive materials and a connecting block with two inlet ports for the connection of a supply line each for core strand and casing strand adhesive material, provided with a sealing sleeve with a sealing cone element at the front tightly inserted or insertable in the expanding opening open at the die end, and with a die location part screwed into said expanding opening with a centrally mounted die pin, through which a core strand supply duct passes in the longitudinal direction for the production of the adhesive core strand, and with a die cone concentrically surrounding said die pin while forming an annular slit for the extrusion of the casing strand, this die cone being tightly connected or connectable to the die location part by means of a union nut, the interior of the sealing sleeve being connected for material flow to the inlet port for the casing strand material by way of an annular slit and radial openings originating therefrom, and the rear internal cone of the die pin being tightly connected to the external cone of the sealing cone element.

The new apparatus permits the precise adjustment of the diameters of the adhesive core strand and its casing sleeve. With the aid of the supply and application speed parameters and by means of adjusting the viscosities and pressure differentials of the casing and core strand polymers according to requirements, diameters and the thickness of the casing skin can be varied within certain limits without any constructive measures in this respect.

As a result of the modular construction of the new adhesive extruder, the entire geometry of the die tip can be adapted to requirements, Die cone and die pin are expediently simple in design and therefore cost-effective in construction as well as interchangeable. They essentially determine the design-defined die gap width of the annular die and thus the total diameter of the adhesive strand or bead. Even defined seams or irregularities in the casing skin can, if required, be applied by means of small inserts between die pin and die cone of by changing the shape of the dies.

A small or narrow metering tip is useful, for potential material irregularities in the groove and/or tongue adhesive can result in unintentional changes in the exit direction of the strand. In order to place the adhesive strand nevertheless precisely where it is wanted, for instance in a groove, it is important to have the tip of the die as close as possible to the base of the groove of the panel when applying the adhesive strand. It is also useful if the tip of the co-extrusion die has small dimensions and is designed to be suitably narrow.

With the new adhesive applicator, it is advisable to ensure precise functional surfaces and adjustability. Thickness tolerances down to 0.03 mm can be achieved for the casing strand extruded from the annular die with an adhesive co-extruder described in more detail below. This applies both to the "cross periphery" and to the longitudinal direction of the adhesive strand. The functional surfaces of the positive locking elements are expediently so arranged that they can—in accordance with relative tolerances—be machined in one setting. This makes high precision possible. In order to compensate for any irregularities, the die cone can be adjusted in relation to the die pin. By rotating the cone relative to the pin, errors can be increased but also largely reduced to a minimum. It is advisable to check this after each assembly.

A compact construction is useful, but a specific scaling of the remaining components is not required in spite of the narrow conditions resulting from the dimensions of the panel grooves. The dimensions of the apparatus are expediently so designed that the preferred coaxial induction of the adhesive polymers is ensured and rigidity and geometry fulfil the relevant precision requirements.

The following test examples a) and b) summarise the results of tests to determine the mechanical strength and adhesion of the bond between the tongue-and-groove positive locking elements of two joined and bonded panels of floor covering.

General description of the mechanical investigation of the bond: The dimensions of the test panels for tensile and shear strength testing were 45×95 mm. The contact melt adhesive was applied to the grooves. In a preferred system, an adhesive bead was applied to each flank surface of the groove using a suitable die.

a) Tensile tests

Figure 1:
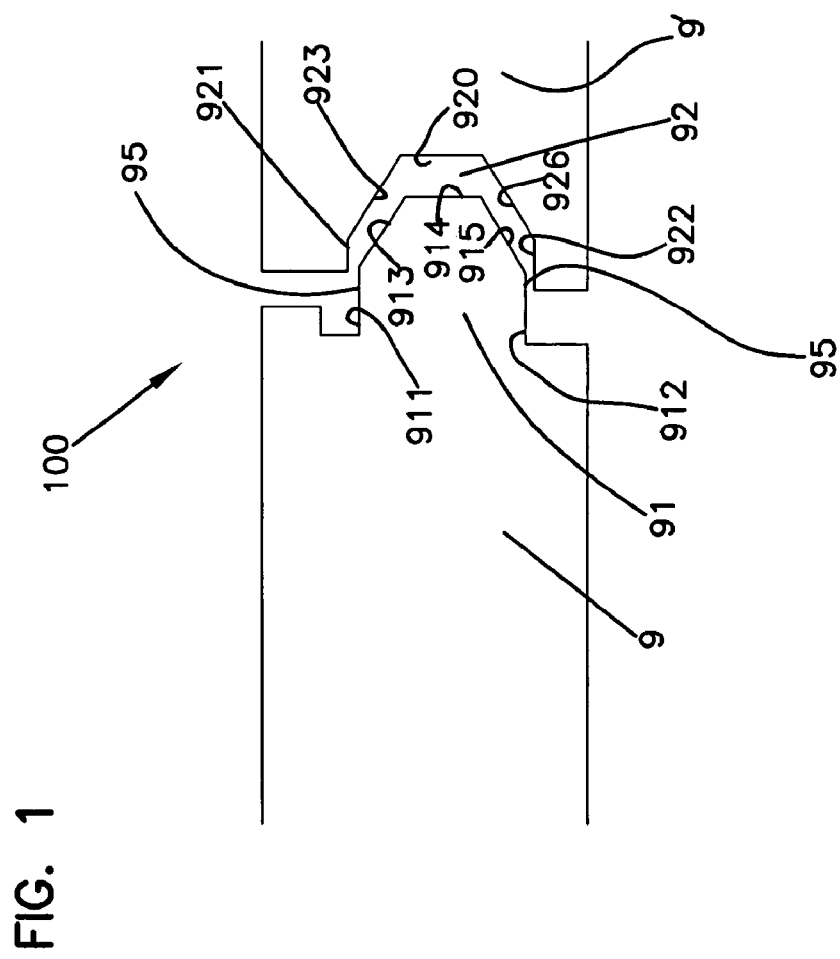
FIG. 1 is cross-sectional view of one example of a covering according to principles of the invention.

One of the two joined and bonded test panels was mounted in the clamping jaws of the testing machine in accordance with FIG. 5 to be explained later, and the panels were pulled apart in opposite directions. Testing speed was 10 mm/min, traversing distance 20 mm. With panels with a tongue-and-groove profile as shown in FIG. 1 and the contact melt adhesive "Dorus PS 534/5" applied to the base of the groove, the average initial strength of the bond was 19.5 kN, while the tensile strength of the tongue-and-groove joint without adhesive bonding was 6 kN.

b) Shear and thrust force tests

Figure 6:
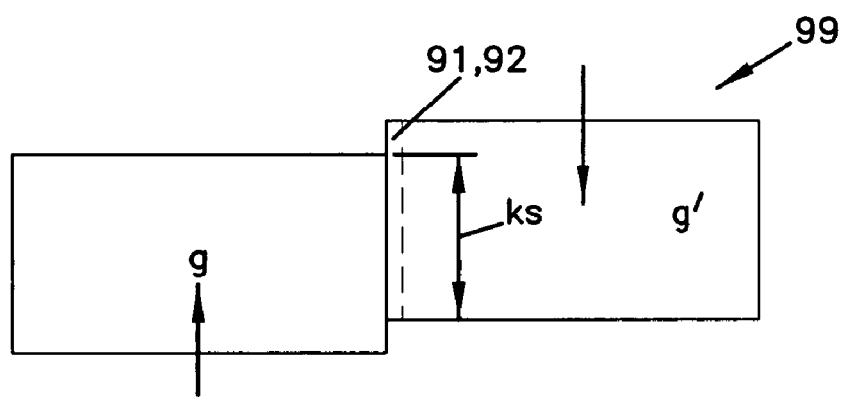
FIG. 6 is a top plan view of two panels of a covering joined together using principles of the present invention, and undergoing a shear strength test.

The test panels according to FIG. 6 were mounted in the relevant testing machine and moved relative to each other—towards each other. Testing speed was 40 mm/min, traversing distance 40 mm. With panels with a tongue-and-groove profile as shown in FIG. 1 and explained later and the contact melt adhesive Dorus PS 534/5, a mean thrust load of 16.5 kN was achieved, while the unbonded tongue-and-groove joint withstood a maximum force of approximately 6.5 kN only.

a) Comparison of the cross-sections of the tongue-and-groove profiles

In order to determine which groove and tongue profiles of the panels are particularly suitable for stable bonding, tensile and shear tests were performed on joined and bonded test panels with various groove and tongue cross-sections.

Tongues with "symmetrical" profiles and correspondingly "symmetrical" grooves were found to be capable of achieving remarkably good results in terms of bond adhesion and a clean joint between the panels. With regard to the typical force and distance development in the tensile test performed on a test piece consisting of two tongue-and-groove panels, there is a first force maximum representing the initial strength of the bond which is critical for its stability. A subsequent second maximum occurring after passing through a minimum following the above maximum is due to the formation of highly viscous adhesive threads and does therefore not indicate the quality of the bond between the panels.

b) Storage life tests

In order to determine the storage life of panels with a contact melt adhesive applied to their grooves before their installation and bonding to form a (floor) covering and thus the effect of storage time on the strength of the bond, an adhesive bead was applied to the groove of the panels prior to the preparation of test pieces made up of two standard tongue-and-groove panels according to FIG. 1, followed by the storage of the panels thus coated with ready-for-bonding adhesive for varying periods of time. The test panels were stored in the usual workshop conditions with average dust and contaminant loading. The storage periods were 1, 2, 5, 7, 14 and 22 days. At the end of each period, the two panels were assembled to form the above test pieces and tested under shear and thrust loads. The following Tables 1 and 2 show the test results for bonded test pieces made of panels to which a contact melt adhesive was applied at the production stage under tensile and thrust loading. The force values listed in the tables correspond to the initial strength of the bond, i.e. the first force maximum as described above, which coincides with the breaking of the bond. For each measurement, 3 test pieces were subjected to tensile and thrust loading, and the average test results are listed in Tables 1 and 2.

TABLE 1

Initial strength of the stored bond under tensile loading

| Force [kN] | Number of days after application of contact melt adhesive | | | | | |
|---|---|---|---|---|---|---|
| (average from 3 measurements) | 1 | 2 | 5 | 7 | 14 | 22 |
| | 21 | 24 | 30 | 30 | 20 | 18 |

TABLE 2

Initial strength of the stored bond under thrust loading

| Force [kN] | Number of days after application of contact melt adhesive | | | | | |
|---|---|---|---|---|---|---|
| (average from 3 measurements) | 1 | 2 | 5 | 7 | 14 | 22 |
| | 18.5 | 29 | 31 | 26 | 22 | 26 |

As the two tables indicate, the initial strength of the bond remains essentially stable during the storage period of the panels both under tensile and under thrust loading following the factory application of the contact melt adhesive and is therefore virtually unaffected by the length of storage. The open storage conditions described above did not appear to have any significant adverse effects.

Nor were any changes, such as joining problems due to the increasing cure of the contact melt adhesive, which might be influenced by the storage time of the panels coated with adhesive in their grooves, observed when joining the panels to make test pieces.

The example below illustrates the improvements made possible by applying adhesive to panels with click-in positive locking elements at the production stage, i.e. to panels positively interlocked in at least two directions a right angles to each other.

EXAMPLE

Timber laminate panels of normal thickness and normal laminate structure with the tongue-and-groove cross-section illustrated diagrammatically in FIG. 3, which will be explained later, were sprayed with layers of contact melt adhesive, first only on the two lateral flanks of the undercut groove capable of spreading when joining the panels and then only on the lateral flanks of the tongue with its "neck" and thickened "head" cross-section. In further tests, adhesive was applied to both the grooves and the tongues.

The contact melt adhesive was applied with a heated, pneumatically operated metering gun. At approximately 170° C., the adhesive was liquid enough to form a thin spray film when applied with the aid of a pneumatic diffusor. The production parameters defining the spray film and its thickness are supply pressure, temperature, diffusor air pressure and speed of application. The possible forms and types of adhesive film are virtually unlimited.

Figure 3:
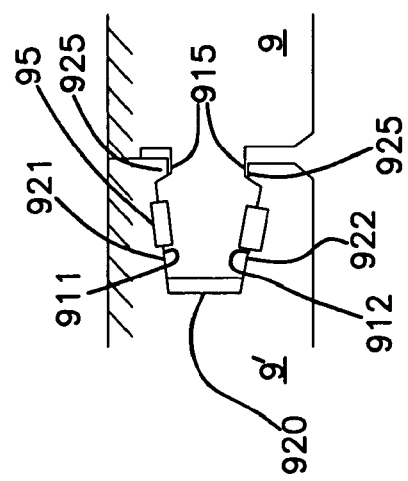
FIG. 3 is a cross-sectional view of another example of a covering according to principles of the invention.

When testing the snap-in (or snap) profile according to FIG. 3, a thin adhesive film with an average thickness of 0.17 mm was chosen in order not to make the joining of the panels difficult. Film thicknesses of more than 0.2 to 0.25 mm were found to impede the mutual interlock of the profiles, thus in the end weakening the bond. Following the spray application, the panels or the test pieces as described in examples a to d were stored for seven days and then joined. The test pieces were then tested with a quasi-static testing machine. Five test pieces each were produced, and five were joined without adhesive for reference in order to measure the interlocking force of the snap profiles. In further tests, a contact melt adhesive was—as mentioned above—applied in the melted state to the groove, the tongue and both. The width of the test pieces was 45 mm, the test speed 10 mm/min.

The results are shown in Table 3, giving averages from five test pieces:

Table 3: Snap profile according to FIG. 6 with and without adhesive applied

| Contact melt adhesive CMA | no CMA | CMA on groove only | CMA on tongue only | CMA on groove and tongue flanks | |
|---|---|---|---|---|---|
| | | | | 0.17 mm thick | 0.1/0.1 mm |
| Tensile strength (kN) | 0.046 | 0.076 | 0.075 | 0.027 | 0.072 |
| Tensile shear strength (MPn) | 0.15 | 0.24 | 0.23 | 0.09 | 0.21 |

This example indicates that the spray application of a contact melt adhesive during the production of the panels combined with a snap interlock can substantially and without any major technical effort improve the lateral bond between currently produced panels equipped with profiles of this design. The adhesive supports the positive locking action and increases the strength of the bond by 65 to 70% compared to snap profiles without adhesive. Snap profiles are profiles with groove flanks of equal length, the grooves effecting an interlock at right angles to the surface in co-operation with corresponding tongues. As described above, there may be a further interlocking element within the groove contributing to an interlock parallel to the surface.

Another remarkable result was the significantly reduced variation of the tensile and shear strength values compared to a purely mechanical click-in joint. The application of a contact melt adhesive by means of hot spraying at the production stage is a safe process and results in a high repeatability of the increased mechanical strength of the tongue-and-groove click-in joint.

Panels with the so-called click-in/snap joints, i.e. panels interlocked by means of positive locking in the two directions referred to above, were furthermore found to have a significantly improved moisture tolerance. Tests led to the conclusion that floor panels with the so-called click-in/snap joints are unavoidably damaged by moisture within a few years. By using the bonding method according to the invention, this damage can be avoided for many more years compared to prior art.

Panels with click-in or snap joint offer the advantage that they can be installed by the average user. The invention significantly improves this product without requiring any technical expertise.

The invention is described in detail with reference to the drawing.

Figure 2:
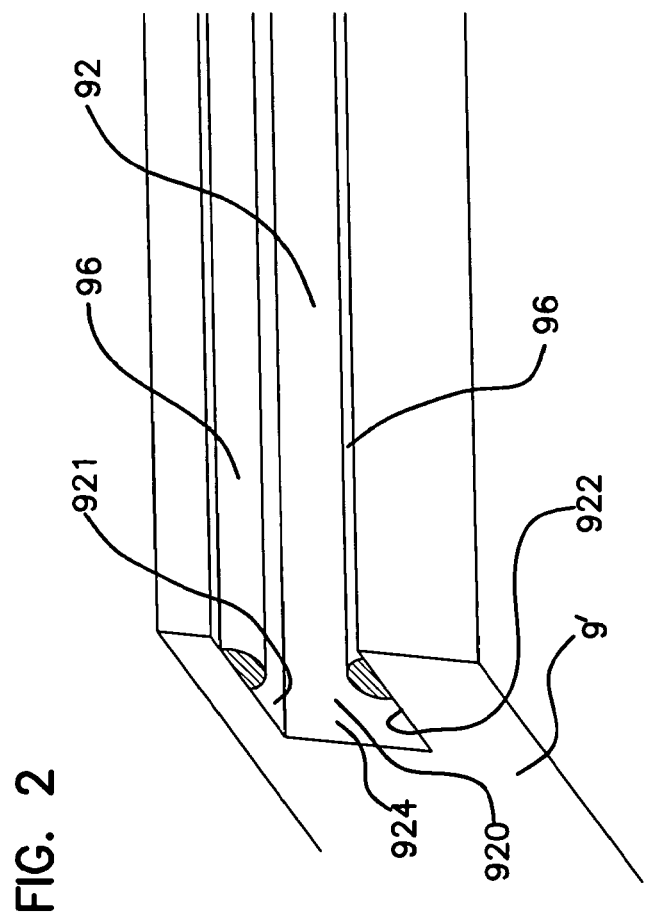
FIG. 2 is a perspective view of a strand of adhesive applied to flank surfaces of a groove according to principles of the invention.
Figure 4:
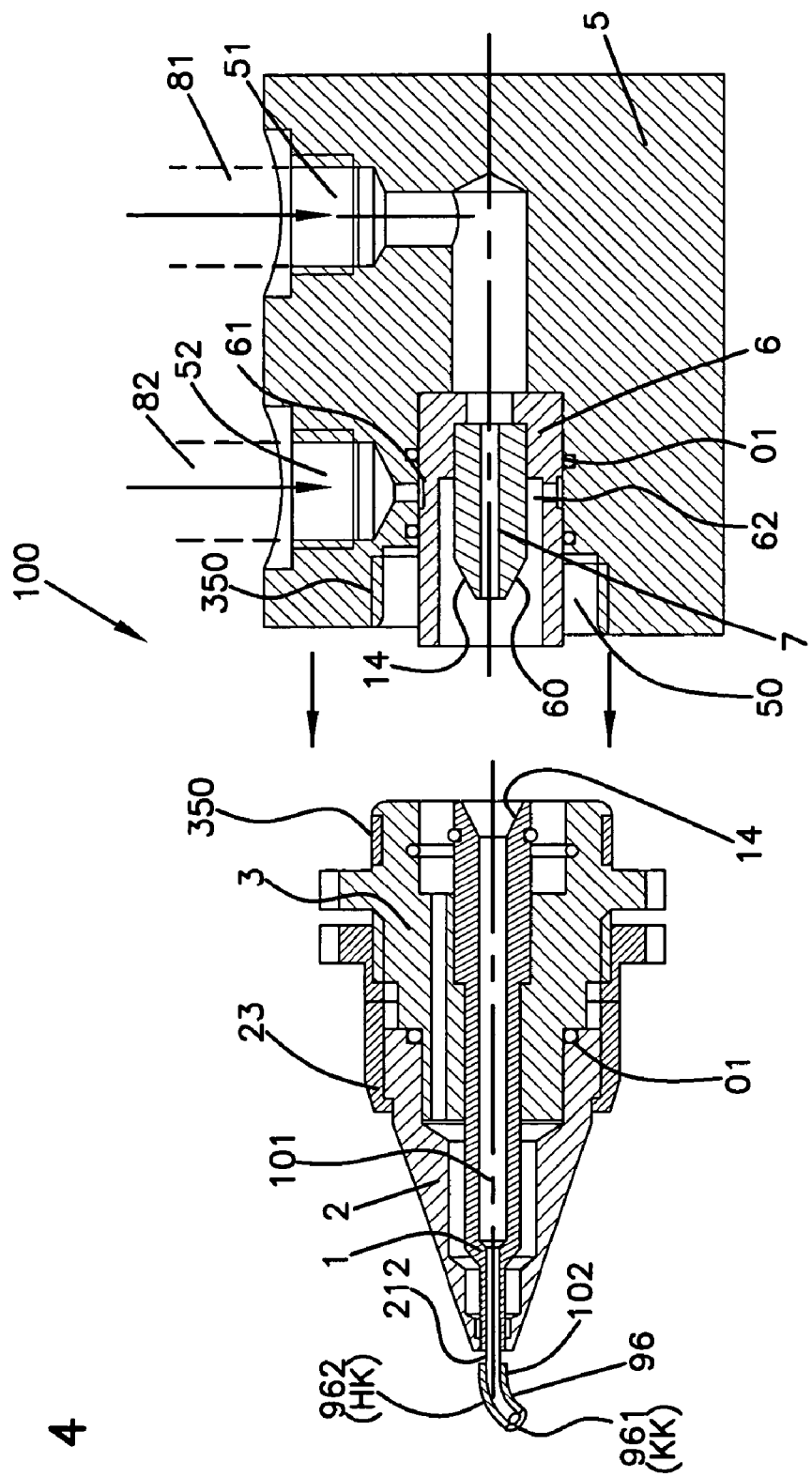
FIG. 4 is a cross-sectional view of an apparatus for applying an adhesive to a covering according to principles of the invention.

FIG. 1 is a diagrammatic section through part of a covering according to the invention with the lateral flanks of two panels to be joined with surfaces for the application of adhesive; FIG. 2 is a diagrammatic oblique view of the application of a strand of adhesive to the flank surfaces of the groove of a panel according to the invention capable of being joined by bonding; FIG. 3 is a section through two joined panels with a mutually interlocking tongue-and-groove joint supported by the application of adhesive; FIG. 4 shows the preferred apparatus as described above for the co-extrusion of a core and casing adhesive strand and for its application to the grooves or the tongues of the panels; FIG. 5 is a diagram of two panels joined to form a test piece for the determination of their tensile strength; and FIG. 6 is a diagram of two joined panels for the determination of their shear strength.

The two panels 9 and o', the sides of which are shown at a distance from and next to each other, are in a state immediately before joining and bonding. It shows where the tongue 91 of the panel 9 and the groove 92 of the panel 9' to be joined to the panel 9 can be coated with adhesive, in the illustrated case an adhesive layer 95 of substantially even thickness. In this context, it should be pointed out that by no means—as shown—all tongue flank surfaces 911, 912 and other tongue flank surfaces 913-915 and/or groove flank surfaces 921, 922 and other groove flank surfaces 923-925 need to have an adhesive coating 95. Depending on the stability requirements of the bond and on the type of adhesive used, only one of the flank surfaces 911, 912 or 921 or 922 may have to be coated, or else, as is possible with two-component adhesives, two co-operating pairs of flank surfaces 911, 921 and/or 912, 922 of the panels 9, 9' to be joined may be or may have to be coated with adhesive or an adhesive precursor. In many cases, as shown in FIG. 8, the application of an adhesive filler, an adhesive strand or the like to the groove 92 of the panel 9, i.e. the base 920 of the groove only, is preferred. This is in particular the case when panels are to be joined mainly by adhesive. If moisture problems are to be reduced to a minimum, at least the contact surface between the two panels 9, 9', which, according to FIG. 1, encloses a right angle with the surface of the two panels and lies above the flank surface 911, should be coated with an adhesive according to the invention. According to a variant using a two-component system, a "dry" adhesive 95 can be applied to the base 920 of the groove, while the tongue 91 of the mating panel 9' it coated, sprayed, wetted or the like with an activator for the adhesive 95 in the groove 92, 920 both on its flank surfaces 921, 922 and on its front faces 923-925. The activator can, for instance, be applied to the tongue 91 by aqueous application with a sponge immediately before the panels, 9, 9' are joined and bonded.

If moisture problems are to be avoided and adhesive is displaced while two panels are joined, the adhesive applied at the production stage preferably does not reach the surface of the two panels. Instead of this, it is so applied and dimensioned that it reaches or at least nearly reaches the surface in the course of being displaced, without, however, being extruded at the surface.

FIG. 2 illustrates—with otherwise identical reference numbers as in FIG. 1—the application of a contact melt adhesive bead 96 to each of the two flank surfaces 921, 922 of the groove 92 of a panel 9, the adhesive spreading, when the tongue of a mating panel to be joined and bonded—which is here not illustrated—is inserted, in a thin film over the flank surfaces 921, 922, possibly into the base 920 of the groove and over the flank surfaces of the tongue not illustrated here.

The section of FIG. 3 shows two joined panels 9, 9', the flanks 921, 922 of the groove 92 spreading obliquely outward, with thickened edges 925 at the entry of the groove forming a kind of undercut.

This undercut groove co-operates with the obliquely tapering flanks 911, 912 of the tongue 91, which have a narrowed section 915 in the manner of a neck on both sides in the shoulder area adjacent to the panel 9.

This narrowed section 925 engages the thickened edges 925 of the groove 92 when the panels 9, 9' are joined, following the spreading of the groove at the insertion of the tongue 91. The preferred points for the adhesive coating 95 on the flanks 921, 922 and/or 911, 912 of the groove 92 and/or the tongue 91 are indicated by bold lines.

The apparatus 100 shown in FIG. 4 for the application of an integral adhesive strand 96 comprising a core strand 961 of core strand adhesive KK and a surrounding casing strand 962 of casing strand polymer HK to the groove and/or the tongue of the panels of a covering, in particular of a floor covering, not shown here by means of co-extrusion through a core die 102 and an annular die 212 concentrically surrounding the former comprises a plurality of components with tight unthreaded connections in the area of contact with the gelatinous fluid adhesive materials, the first being a connecting block 5 having an inlet port 51, 52 each for the connection of supply lines 81, 82 for the core strand material KK and the casing strand material HK. A sealing sleeve 6 with a sealing cone element 7 installed in the connecting block 5 projects into its expanding opening 50. This expanding opening 50 contains a die location part 3 with a centrally or concentrically mounted die pin 1 through which a core strand supply duct 101 passes for the production of the adhesive core strand 961 and with a die cone 2 concentrically surrounding said die pin while forming an annular slit 120 for the extrusion of the adhesive casing strand 962, said die location part being installed by means of a threaded connection 350.

A union nut 23 provides for a tight connection between the die cone 2 and the die location part 3. The interior 60 of the sealing sleeve 6 is connected for material flow to the inlet port 52 for the casing strand material HK by way of radial passages 62 and an annular duct 61. The rear internal cone 14 of the die pin 2 of the assembled apparatus is tightly connected to the external cone 74 of the sealing cone element 7. In order to ensure that the seal between the above components of the new apparatus 100 can withstand adhesive supply pressures up to 20 bar, sealing rings 01 are installed at several points inside the apparatus.

It is advisable to provide for good flow conditions in the new apparatus 100, for the relatively high viscosities of the HK polymer for the adhesive casing strand 962 result in considerable dynamic pressure losses. Chamfered edges, flat cones and progressive cross-sectional transitions in the interior of the apparatus 100, through which the adhesive flows, are therefore vital. These and other relevant criteria will have to be considered carefully in order to guarantee the high extrusion and application speeds which are a precondition for the industrial-scale production of ready-for-bonding panels.

The new apparatus 100 has to be robust in construction to withstand the feed pressures used for the adhesive polymers. Small radial tolerances for the annular slit 212 of the die are also advisable and can be achieved by solid and stable construction. The new apparatus 100 is expediently so built that its geometry remains largely unaffected by prolonged use and operation. The continuity of the adhesive casing strand or sleeve must not be affected by contact with the wood or timber material during the application of the adhesive. In the illustrated embodiment of the adhesive strand co-extruder 100, the thin, elongated die pin 1 is protected by the rigid cone 2 of the "external" die tip, which is located in a generously sized location of the die location part 3. Sealing faces and location should generally be protected by less important contours. In a practical embodiment it may, for instance, be ensured that the edge of a die cone location lies in a concave area and can therefore not be damaged by falling on a plane. Chamfered edges, too, can prevent inaccuracies due to minor damage. All die components subject to high mechanical and possibly chemical requirements are preferably made of special steel. This material has a high enough mechanical strength and chemical resistance to ensure a long life.

The cleaning of the new apparatus does not pose any problems either: its simple and smooth geometry, its good surface finish, chemically stable materials and easy dismantling into individual parts in contact with adhesive for easy access for cleaning, straight passages and a minimum of undercuts simplify cleaning. Threaded parts should, as mentioned above, be avoided in areas through which adhesive polymers flow. The union nut 23 of the die head of the apparatus 100 shown in FIG. 1 offers advantages in this context.

With regard to the interfaces and connections, it is advisable to fit all supply lines 81, 82 for adhesive polymer with straight standard pipe connectors.

With regard to the costs of the new adhesive strand applicator, these are primarily connected with high-precision manufacture and with the materials used. The design described and illustrated here allows fast cleaning, dismantling, assembly and the fast preparation of the apparatus and the associated metering schedule. Consumables are seals, which have to be replaced periodically, pressure hoses, cartridge applications and cleaning aids and solvents. All sealing rings 01 in contact with adhesive polymer are expediently reduced to a single size and thickness.

With regard to the metering system as a whole, some requirements have already been explained above, such as ease of use, adjustable, consistent and bubble-free supply, easy dismantling, quick cleaning, easy handling and reliable operation.

A feed system supported by compressed gas was found useful for the adhesive materials. Pressures up to 50 bar are easily achieved at low cost. Experiences gathered when testing the new adhesive applicator indicate that the polymers or polymer precursors used for applying adhesive beads to the grooves can be fed at adequate processing speed with pressures of less than 30 bar. Since polymer adhesives are compressible as a rule, it is advisable to place a shut-off device for the interruption of the flow as close as possible to the die opening.

The most commonly used commercial containers for the starting materials are 310 to 400 ml Eurocartridges. It is important that both the adhesive core and the adhesive casing material is placed in a pressure cylinder and conveyed from there by means gas-pressurised piston. It has been found to be expedient to feed the core strand material, i.e. the ready-for-bonding glue, in accordance with a feed schedule which is independent of that for the casing strand material. The low viscosity of the glue core strand allows, for instance, a reduction in gas pressure down to 5 to 6 bar. Another pressure cylinder is provided for the adhesive or polymer, in particular butyl rubber, used for the formation of the casing strand.

The necessary feed pressure may expediently be provided by a compressed nitrogen gas bottle with the usual diaphragm-type pressure reducer.

Figure 5:
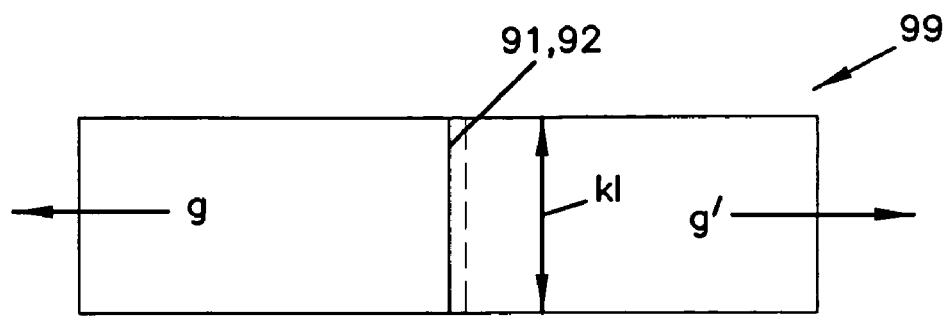
FIG. 5 is a top plan view of two panels of a covering joined together using principles of the present invention, and undergoing a tensile strength test.

FIG. 5 shows two panels 9, 9' measuring 45 mm×95 mm joined and bonded to form a test piece 99 by means of a tongue-and-groove joint 91, 92 according to the invention, with a length k1 (=45 mm), which are subjected to tensile forces—in accordance with the two arrows pointing away from each other—in order to test the tensile strength of the bond 91, 92, 95. The bond has a length k1 of 45 mm.

FIG. 6 shows two panels 9, 9' of the same dimensions joined and bonded over a distance ks of 40 mm to form a test piece 99, which are subjected to corresponding forces in the directions indicated by the two arrows in FIG. 6 in order to determine the shear strength of the bond 91, 92, 95.

FIG. 7 shows panels 9 and 9', which can as such be joined without glue by rotating about their common joint. To protect them against moisture, the invention provides for the application of an adhesive to the joint, which is activated only by or after joining the panels. The adhesive is preferably applied to the contact surfaces 1000 and/or 1001 adjacent to the surface of the panels according to the invention. This most effectively prevents the entry of moisture from the top. As the pressure acting on the joint and thus on the contact surfaces 1000 and 1001 is transmitted by lever action due to the rotary movement indicated by arrow 1002, an adhesive activated by pressure can here be used without causing any problems.

The invention claimed is:

1. A floor covering comprising:
    a first panel having a laterally mounted interlocking first element comprising a groove formed at an edge of the first panel with lateral groove flank surfaces extending obliquely outwardly, and an undercut at a groove entry; the edge of the first panel above the groove entry being offset from the edge of the first panel below the groove entry;
    the first element including a water activatable adhesive material, wherein said adhesive material is in a passive state at room temperature and transitions from the passive state to an active state at room temperature upon contact with water or water moisture and stabilizes by extraction of water;
    a second panel with a second laterally mounted interlocking element comprising a tongue extending from an edge of the second panel and having lateral tongue flank surfaces tapering obliquely, the tongue including a neck portion engaging the undercut, wherein the edge of the second panel defines a recess above the neck of the tongue, the edge of the first panel below the entry to the groove and the edge of the second panel below the tongue are spaced apart when the first panel and the second panel are engaged, the second element including said adhesive material;
    the groove flank surfaces and the tongue flank surfaces and the tongue flank surface receiving said adhesive material, and said adhesive material is coated on said first element groove, said second element tongue, or both said first element groove and said second element tongue; and
    wherein the first and second panels comprise a timber material, said first and second panels having complementary lateral positive mechanically interlocking elements configured for mutual snap-in engagement between each other.

2. The covering according to claim 1, wherein the adhesive is laterally applied to a contact surface of the groove flank surfaces and the tongue flank surfaces adjoining a primary surface of the panels.

3. The covering according to claim 1, wherein the adhesive material is selected from the group consisting of a polyvinyl acetate, a starch-based adhesive, a protein-based adhesive, and mixtures thereof.

4. The covering according to claim 1, wherein the edge of the second panel defines a recess proximate and above the neck of the tongue.

* * * * *